United States Patent
Nishida

(10) Patent No.: US 11,640,085 B2
(45) Date of Patent: May 2, 2023

(54) LIQUID CRYSTAL DEVICE, MANUFACTURING METHOD OF LIQUID CRYSTAL DEVICE, AND ELECTRONIC APPARATUS

(71) Applicant: SEIKO EPSON CORPORATION, Tokyo (JP)

(72) Inventor: Masakazu Nishida, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/506,653

(22) Filed: Oct. 20, 2021

(65) Prior Publication Data
US 2022/0128853 A1    Apr. 28, 2022

(30) Foreign Application Priority Data

Oct. 22, 2020 (JP) .............................. JP2020-177403

(51) Int. Cl.
*G02F 1/1339*    (2006.01)
*G02F 1/1343*    (2006.01)

(52) U.S. Cl.
CPC .... *G02F 1/13394* (2013.01); *G02F 1/134309* (2013.01)

(58) Field of Classification Search
CPC ........... G02F 1/13394; G02F 1/133734; G02F 1/1337; G02F 1/134309; C09K 19/54
See application file for complete search history.

(56) References Cited

U.S. PATENT DOCUMENTS

| | | | |
|---|---|---|---|
| 2005/0057715 A1* | 3/2005 | Hashimoto | G02F 1/133734 349/125 |
| 2013/0107182 A1* | 5/2013 | Hagiwara | G02F 1/133707 349/110 |
| 2014/0125905 A1* | 5/2014 | Matsui | G02F 1/134363 349/43 |
| 2017/0110477 A1* | 4/2017 | Han | G02F 1/1339 |
| 2018/0113335 A1* | 4/2018 | Jin | G02F 1/13394 |
| 2021/0271126 A1* | 9/2021 | Tsuno | G02F 1/13396 |
| 2021/0286210 A1* | 9/2021 | Wakayama | G06F 3/047 |

FOREIGN PATENT DOCUMENTS

| | | |
|---|---|---|
| JP | 2007264265 | 10/2007 |
| JP | 2009122409 | 6/2009 |
| JP | 2010026274 | 2/2010 |
| JP | 2016090698 | 5/2016 |

\* cited by examiner

*Primary Examiner* — Mariam Qureshi
(74) *Attorney, Agent, or Firm* — JCIPRNET

(57) ABSTRACT

A liquid crystal device includes a first substrate, a second substrate, a liquid crystal layer disposed between the first substrate and the second substrate, the liquid crystal layer including liquid crystal molecules, a spacer disposed between the first substrate and the second substrate, the spacer being configured to define a distance between the first substrate and the second substrate, an electrode disposed between the first substrate or the second substrate and the liquid crystal layer, the electrode being configured to apply an electric field to the liquid crystal layer, and an inorganic oriented film disposed between the electrode and the liquid crystal layer.

9 Claims, 11 Drawing Sheets

LIQUID CRYSTAL DEVICE, MANUFACTURING METHOD OF LIQUID CRYSTAL DEVICE, AND ELECTRONIC APPARATUS

The present application is based on, and claims priority from JP Application Serial Number 2020-177403, filed Oct. 22, 2020, the disclosure of which is hereby incorporated by reference herein in its entirety.

BACKGROUND

1. Technical Field

The present disclosure relates to a liquid crystal device, a manufacturing method of a liquid crystal device, and an electronic apparatus.

2. Related Art

A liquid crystal device such as a liquid crystal display device capable of changing optical characteristics for each pixel is used for an electronic apparatus such as a projector, for example.

A liquid crystal display device described in JP-A-2016-90698 includes a first substrate, a second substrate, and a liquid crystal layer disposed between the first substrate and the second substrate. A pixel electrode is provided at the first substrate, and an oriented film is provided at the pixel electrode. A counter electrode is provided at the second substrate, and another oriented film is provided at the counter electrode. The oriented film is formed by an oblique vapor deposition method. The oriented film orients liquid crystal molecules.

Further, in the liquid crystal display device described in JP-A-2016-90698, a spacer is disposed between the first substrate and the second substrate.

When the oriented film is formed by the oblique vapor deposition after the spacer is formed, a perimeter of the spacer becomes a shadow of the spacer. As a result, a region at which the oriented film cannot be formed is generated near the spacer. At a location where the oriented film is not formed, the liquid crystal molecules do not orient as desired, and thus light leakage occurs at the location. As a result, image defects occur. Furthermore, the orientation of the liquid crystal molecules is discontinuous, etc. between the location where the oriented film is formed by the oblique vapor deposition and the locations where the oriented film is not formed. As a result, there is a problem in that the image defects are prominent and display quality is reduced.

SUMMARY

An aspect of a liquid crystal device of the present disclosure includes a first substrate, a second substrate, a liquid crystal layer disposed between the first substrate and the second substrate, the liquid crystal layer including liquid crystal molecules, a spacer disposed between the first substrate and the second substrate, the spacer being configured to define a distance between the first substrate and the second substrate, an electrode disposed between the first substrate or the second substrate and the liquid crystal layer, the electrode being configured to apply an electric field to the liquid crystal layer, and an inorganic oriented film disposed between the electrode and the liquid crystal layer, wherein the inorganic oriented film includes a vapor deposition film including a columnar column extending inclinedly with respect to a normal line to a surface of the electrode, the vapor deposition film includes a first region and a second region located between the first region and the spacer in plan view, and a film thickness of the second region is less than a film thickness of the first region.

An aspect of a manufacturing method of a liquid crystal device of the present disclosure is a manufacturing method of a liquid crystal device including a first substrate, a second substrate, and a liquid crystal layer disposed between the first substrate and the second substrate, the method comprising an electrode at the first substrate, the electrode being configured to apply an electric field to the liquid crystal layer, forming a spacer at the first substrate formed with the electrode, the spacer being configured to define a distance between the first substrate and the second substrate, forming an inorganic oriented film by oblique vapor deposition at the first substrate formed with the electrode and the spacer, wherein in the oblique vapor deposition, a vapor deposition angle is changed so that the vapor deposition angle increases over time from 0° to a predetermined angle less than 45° with respect to a normal line to a surface of the electrode.

An aspect of an electronic apparatus of the present disclosure includes the liquid crystal device described above, and a control unit configured to control operation of the liquid crystal device.

DESCRIPTION OF EXEMPLARY EMBODIMENTS

Figure 1:
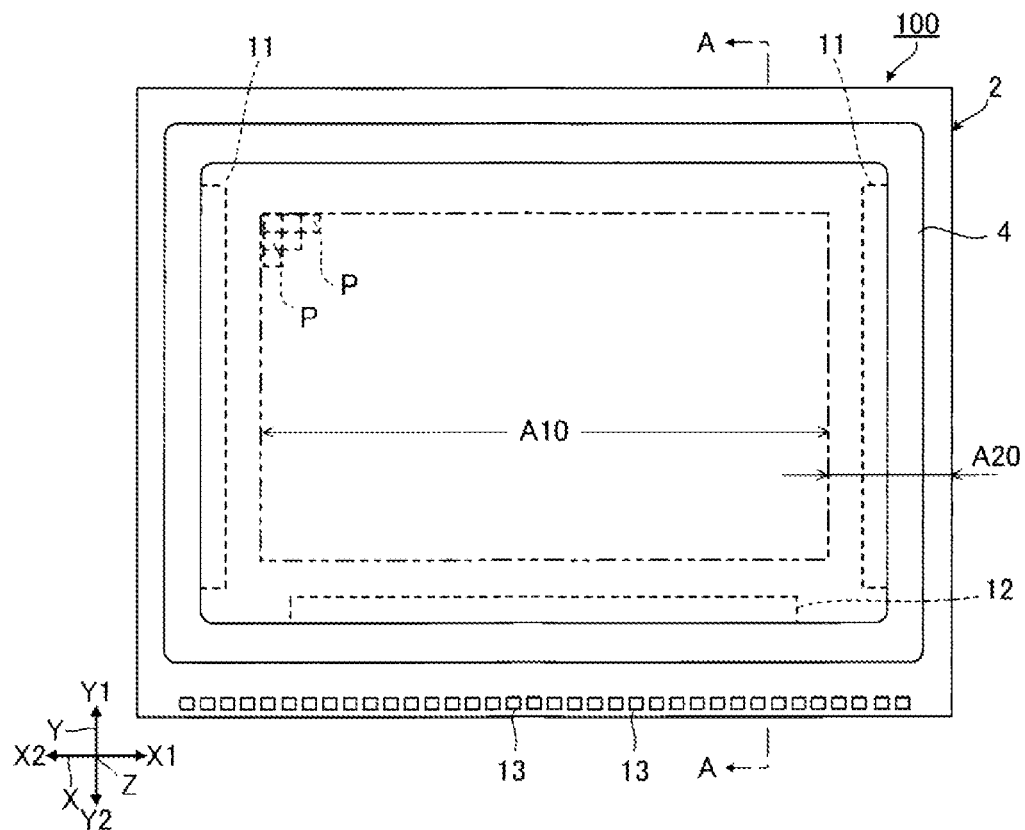
FIG. 1 is a plan view of a liquid crystal device according to a first exemplary embodiment.

Preferred embodiments of the present disclosure will be described below with reference to the accompanying drawings. Note that, in the drawings, dimensions and scales of sections are differed from actual dimensions and scales as appropriate, and some of the sections are schematically illustrated to make them easily recognizable. Further, the scope of the present disclosure is not limited to these embodiments unless otherwise stated to limit the present disclosure in the following descriptions.

1. Liquid Crystal Device

1A. First Exemplary Embodiment

1Aa. Basic Configuration

Figure 2:
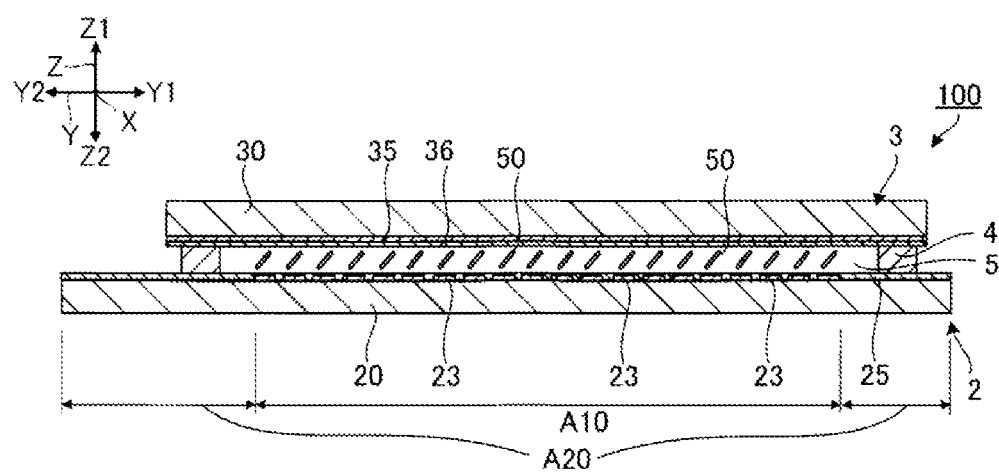
FIG. 2 is a cross-sectional view taken along a line A-A of the liquid crystal device illustrated in FIG. 1.

FIG. 1 is a plan view of a liquid crystal device 100 according to a first exemplary embodiment. FIG. 2 is a cross-sectional view taken along a line A-A of the liquid crystal device 100 illustrated in FIG. 1. Note that in FIG. 1, an illustration of a counter substrate 3 is omitted. Note that, for convenience of explanation, the description will be made appropriately using an X-axis, a Y-axis, and a Z-axis orthogonal to each other. In addition, one direction along the X-axis is designated as an X1 direction, and the direction opposite the X1 direction is designated as an X2 direction. Similarly, one direction along the Y-axis is designated as a Y1 direction, and the direction opposite the Y1 direction is designated as a Y2 direction. The direction along the Z-axis is designated a Z1 direction, and the direction opposite the Z1 direction is designated as a Z2 direction. The Z1 direction corresponds to a normal direction of an element substrate 2, and the Z2 direction corresponds to a normal direction of the counter substrate 3. Additionally, in the following, viewing in the Z1 direction or the Z2 direction is referred to as "plan view", and viewing from a direction perpendicular to a cross section including the Z-axis is referred to as "cross-sectional view".

The liquid crystal device 100 illustrated in FIGS. 1 and 2 is a transmissive liquid crystal device in an active matrix driving method. As illustrated in FIG. 2, the liquid crystal device 100 includes the element substrate 2 having translucency, the counter substrate 3 having translucency, a sealing member 4 having a frame shape, and a liquid crystal layer 5. The element substrate 2, the liquid crystal layer 5, and the counter substrate 3 are arranged in this order in the Z1 direction. Also, although not illustrated in FIGS. 1 and 2, the liquid crystal device 100 includes a plurality of spacers that define a thickness of the liquid crystal layer 5. In addition, the shape of the liquid crystal device 100 illustrated in FIG. 1 in plan view is rectangular, but may be, for example, circular. In the following description, the "translucency" refers to transparency to visible light, and means that a transmittance of visible light is greater than or equal to 50%.

The element substrate 2 illustrated in FIG. 2 is a substrate having a plurality of TFTs (Thin Film Transistors) described below. The element substrate 2 includes a first substrate 20 having translucency, a plurality of pixel electrodes 23 having translucency, and a first oriented film 25 having translucency. The first oriented film 25 is an example of an "inorganic oriented film", and the pixel electrode 23 is an example of an "electrode." Also, although not illustrated, the element substrate 2 includes a plurality of dummy pixel electrodes that surround the plurality of pixel electrodes 23 in plan view.

The counter substrate 3 is a substrate disposed facing the element substrate 2. The counter substrate 3 includes a second substrate 30 having translucency, a common electrode 35 having translucency, and a second oriented film 36 having translucency. The common electrode 35 is a counter electrode disposed at the plurality of pixel electrodes 23 via the liquid crystal layer 5. Also, although not illustrated, the counter substrate 3 has a parting with light shielding properties that surrounds the plurality of pixel electrodes 23 in plan view. The "light shielding" refers to a light shielding property to visible light, and preferably means that a transmittance of visible light is less than 50% and more preferably 10% or less.

Each of the pixel electrodes 23 and the common electrode 35 is used to apply an electric field to the liquid crystal layer 5. Next, detailed configurations of the element substrate 2 and the counter substrate 3 will be described.

The sealing member 4 is disposed between the element substrate 2 and the counter substrate 3. The sealing member 4 is formed using an adhesive containing various types of curable resins such as epoxy resin, for example. The sealing member 4 may include a gap material made from an inorganic material such as glass. Although it is also possible for the gap material to control a distance between the first substrate 20 and the second substrate 30, in the present exemplary embodiment, the distance between the first substrate 20 and the second substrate 30 is controlled with high accuracy over a wide range by a plurality of spacers 6 described later.

The liquid crystal layer 5 is disposed in a region surrounded by the element substrate 2, the counter substrate 3, and the sealing member 4. The liquid crystal layer 5 is disposed between the first substrate 20 and the second substrate 30, and the optical characteristics thereof vary in accordance with the electric field. The liquid crystal layer 5 contains liquid crystal molecules 50 having positive or negative dielectric anisotropy. An orientation of the liquid crystal molecules 50 varies depending on a voltage applied to the liquid crystal layer 5.

As illustrated in FIG. 1, a plurality of scanning line drive circuits 11, a signal line driving circuit 12, and a plurality of external terminals 13 are disposed at the element substrate 2. A portion of the plurality of external terminals 13, although not illustrated, is coupled to wiring drawn from the scanning line drive circuits 11 or the signal line driving circuit 12. Furthermore, the plurality of external terminals 13 include terminals to which a common potential is applied. The terminals are electrically coupled to the common electrode 35 of the counter substrate 3 via wiring and a conductive material (not illustrated).

Such a liquid crystal device 100 includes a display region A10 that displays an image and a peripheral region A20 located outside the display region A10 in plan view. The display region A10 includes a plurality of pixels P arranged in a matrix pattern. The plurality of pixel electrodes 23 are disposed in a one-to-one manner with respect to the plurality of pixels P. The common electrode 35 described above is provided in common with the plurality of pixels P. Also, the peripheral region A20 surrounds the display region A10 in plan view. The scanning line drive circuits 11 and the signal line driving circuit 12 are disposed in the peripheral region A20. Also, although not illustrated, the peripheral region A20 includes a dummy pixel region in which the plurality of dummy pixel electrodes are disposed.

In the present exemplary embodiment, the liquid crystal device 100 is transmissive. In the present exemplary embodiment, the image is displayed by modulating the light incident on the counter substrate 3 while the light is emitted from the element substrate 2. Note that the image may be displayed by modulating the light incident on the element substrate 2 while being emitted from the counter substrate 3. The liquid crystal device 100 may also be reflective. In this case, for example, the common electrode 35 has translucency and the pixel electrodes 23 are reflective. In the case of being reflective, the light incident on the counter substrate 3 is reflected by the pixel electrodes 23 and is again modulated while being emitted from the counter substrate 3, thereby the image is displayed. In the case of being reflective, the element substrate 2 may not have translucency, and may be, for example, a silicon substrate at which an element, etc. can be formed.

In addition, the liquid crystal device 100 is applied to a display device that performs color display, such as a personal computer and a smartphone described below. When applied to the display device, a color filter is appropriately used for the liquid crystal device 100. The liquid crystal device 100 is applied to a projection-type projector described below, for example. In this case, the liquid crystal device 100 functions as a light valve. Note that in this case, a color filter is omitted for the liquid crystal device 100.

1Ab. Electrical Configuration of Element Substrate 2

Figure 3:
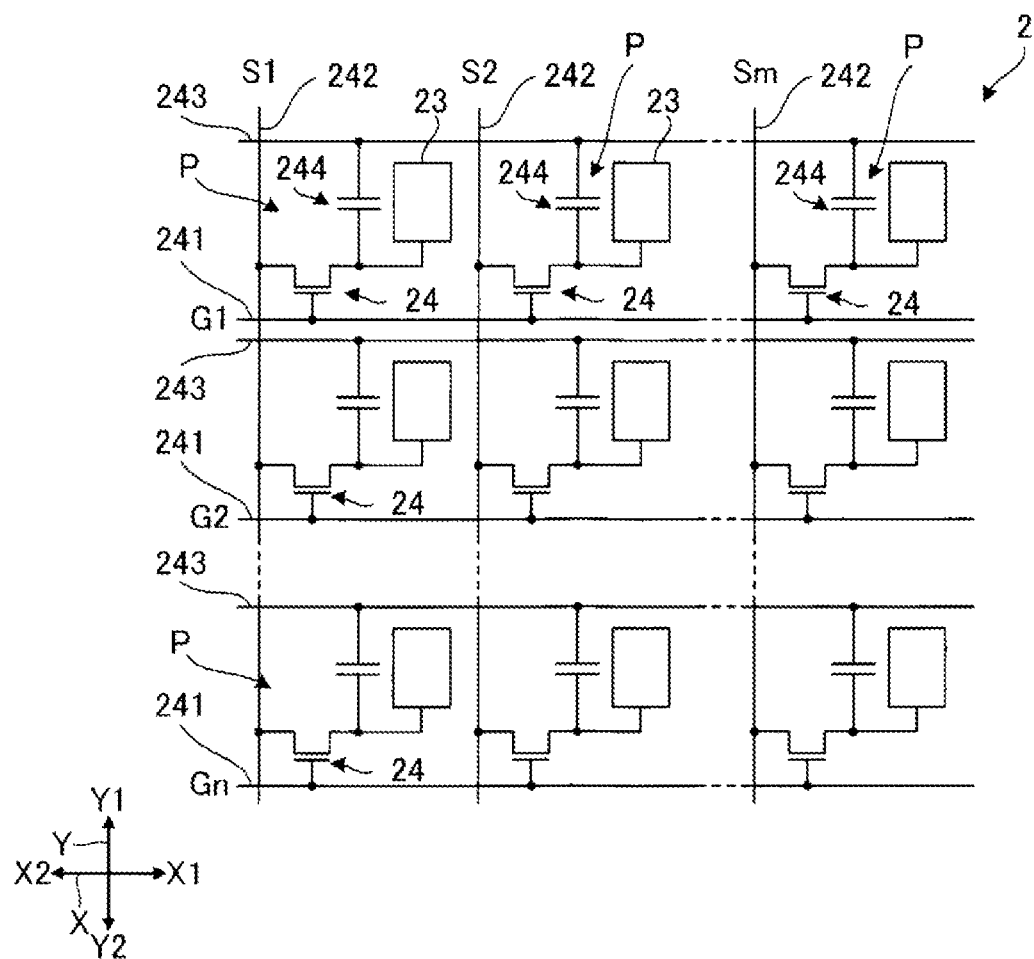
FIG. 3 is an equivalent circuit diagram illustrating an electrical configuration of an element substrate of FIG. 1.

FIG. 3 is an equivalent circuit diagram illustrating an electrical configuration of an element substrate 2 of FIG. 1. As illustrated in FIG. 3, the element substrate 2 includes a plurality of transistors 24, n scanning lines 241, m signal lines 242, and n capacitor lines 243. Note that n and m are integers of 2 or greater, respectively. The transistors 24 are disposed corresponding to each intersection between the n scanning lines 241 and the m signal lines 242. Each transistor 24 is a TFT that functions as a switching element, for example. Each transistor 24 includes a gate, a source, and a drain.

Each of the n scanning lines 241 extends in the X1 direction, and the n scanning lines 241 are arranged at equal intervals in the Y2 direction. The n scanning lines 241 are each electrically coupled to the gates of the corresponding plurality of transistors 24. The n scanning lines 241 are electrically coupled to the scanning line driving circuits 11 shown in FIG. 1 Scanning signals G1, G2, . . . , Gn are line-sequentially supplied to the 1 to n scanning lines 241 from the scanning line driving circuits 11.

Each of the m signal lines 242 illustrated in FIG. 3 extends in the Y2 direction, and the m signal lines 242 are arranged at equal intervals in the X1 direction. The m signal lines 242 are each electrically coupled to the sources of the corresponding plurality of transistors 24. The m signal lines 242 are electrically coupled to the signal line driving circuit 12 shown in FIG. 1 Image signals S1, S2, . . . , Sm are supplied to the 1 to m signal lines 242 from the signal line driving circuit 12 in parallel.

The n scanning lines 241 and the m signal lines 242 shown in FIG. 3 are electrically insulated from each other and are disposed in a grid pattern in plan view. A region surrounded by two adjacent scanning lines 241 and two adjacent signal lines 242 corresponds to the pixel P. Each of the pixel electrodes 23 is electrically coupled to the drain of the corresponding transistor 24.

Each of the n capacitive lines 243 extends in the X1 direction, and the n capacitor lines 243 are arranged at equal intervals in the Y2 direction. Additionally, the n capacitor lines 243 are electrically insulated with respect to the m signal lines 242 and the n scanning lines 241, and are disposed at intervals with respect to each other. A fixed potential such as a ground potential is applied to each of the capacitor lines 243. The n capacitive lines 243 are each electrically coupled to a corresponding plurality of storage capacitors 244. Each storage capacitor 244 is a capacitive element for holding the potential of the pixel electrodes 23. Note that the plurality of storage capacitors 244 are electrically coupled to the plurality of pixel electrodes 23 in a one-to-one manner. The plurality of storage capacitors 244 are electrically coupled to the drains of the plurality of transistors 24 in a one-to-one manner.

When the scanning signals G1, G2, . . . , Gn are sequentially activated and the n scanning lines 241 are sequentially selected, then the transistors 24 coupled to the selected scanning lines 241 are turned to be on-state. Then, the image signals S1, S2, . . . , Sm having a magnitudes corresponding to the gradation to be displayed via the m signal lines 242 are captured in the pixels P corresponding to the selected scanning lines 241, and are applied to the pixel electrodes 23. This allows a voltage in accordance with the grayscale to be displayed to be applied to the liquid crystal capacitor formed between the pixel electrodes 23 and the common electrode 35 in FIG. 2, where the orientation of the liquid crystal molecules 50 varies in accordance with the applied voltage. Note that the applied voltages are held by the storage capacitors 244. Such a variation in the orientation of the liquid crystal molecules 50 causes the light to be modulated, to thus enable grayscale display.

1Ac. Specific Configuration of Liquid Crystal Device 100

Figure 4:
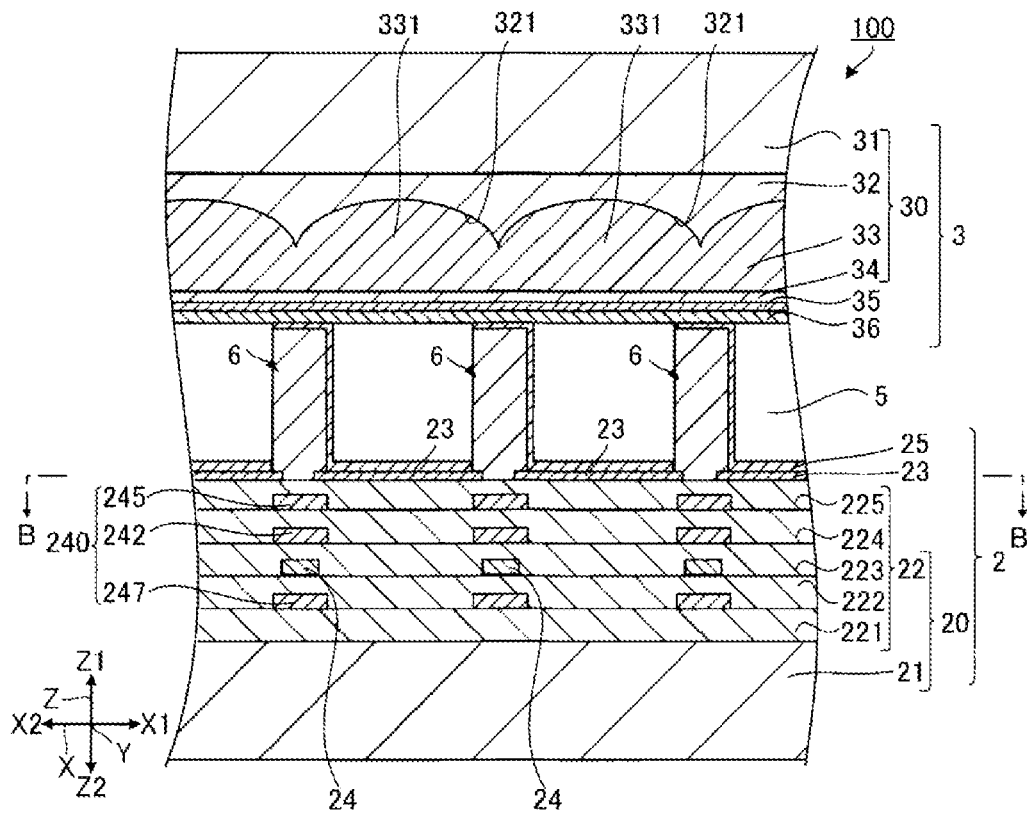
FIG. 4 is an enlarged view of a portion of the liquid crystal device in FIG. 2.

FIG. 4 is an enlarged view of a portion of the liquid crystal device 100 in FIG. 2. As illustrated in FIG. 4, the liquid crystal device 100 includes the plurality of spacers 6 in addition to the element substrate 2, the counter substrate 3, and the liquid crystal layer 5.

1Ac-1. Element Substrate 2

As illustrated in FIG. 4, the element substrate 2 includes the first substrate 20, the plurality of pixel electrodes 23, and the first oriented film 25, as described above. The first substrate 20 includes a first base body 21, a stack body 22, a light shielding portion 240, and the transistors 24 described above. The light shielding portion 240 includes various wiring lines, etc. illustrated in FIG. 3 described above. The first base body 21, the stack body 22, the plurality of pixel electrodes 23, and the first oriented film 25 are stacked in this order in the Z1 direction.

The first base body 21 is a plate having translucency and insulating properties. The first base body 21 is, for example, a glass plate or a quartz plate. The stack body 22 has translucency and insulating properties. The stack body 22 includes a plurality of interlayer insulating films 221, 222, 223, 224, and 225. The interlayer insulating films 221, 222, 223, 224, and 225 are stacked in this order from the first base body 21 toward the plurality of pixel electrodes 23. The material of each layer of the stack body 22 is, for example, an inorganic material such as silicon nitride and silicon oxide.

The plurality of transistors 24 and the light shielding portion 240 are disposed between the layers of the stack body 22. Note that in FIG. 4, the transistors 24 and the light shielding portion 240 are schematically illustrated.

The plurality of transistors 24 are disposed between the wiring, etc. of the light shielding portion 240 in a cross-sectional view. The transistor 24 includes, for example, a semiconductor layer having a LDD (Lightly Doped Drain) structure, a gate insulating layer, and a gate electrode.

The light shielding portion 240 is an aggregate of light shielding films including various wiring, etc. illustrated in FIG. 3 The light shielding portion 240 includes various electrodes that are coupled to various wiring or transistors 24. In FIG. 4, the signal lines 242 are illustrated representatively. In FIG. 4, a relay electrode 245 electrically coupled to the drain of the transistor 24 is illustrated as an example of the various electrodes. The light shielding portion 240 includes a plurality of light shielding films 247 to prevent light from entering the transistor 24.

The wiring, etc. included in the light shielding portion 240 is formed using, for example, a metal such as tungsten (W), titanium (Ti), chromium (Cr), iron (Fe), and aluminum (Al), metal silicide, or metal compounds.

Also, although not illustrated, the first substrate 20 may have a layer including glass such as, for example, a BSG (borosilicate glass) disposed at a surface of the stack body 22 on the pixel electrodes 23 side.

The plurality of pixel electrodes 23 are disposed between the first substrate 20 and the liquid crystal layer 5. In the present exemplary embodiment, the pixel electrodes 23 have translucency and conductivity. The pixel electrodes 23 include, for example, transparent conductive materials such as ITO (Indium Tin Oxide), IZO (Indium Zinc Oxide) and FTO (Fluorine-doped tin oxide).

The first oriented film 25 has translucency and insulating properties. The first oriented film 25 orients the liquid crystal molecules 50 of the liquid crystal layer 5. The first oriented film 25 is disposed covering the plurality of pixel electrodes 23. The first oriented film 25 covers a portion of the spacer 6. Examples of the material of the first oriented film 25 include inorganic materials such as silicon oxide. Note that the first oriented film 25 is described in detail below.

Figure 5:
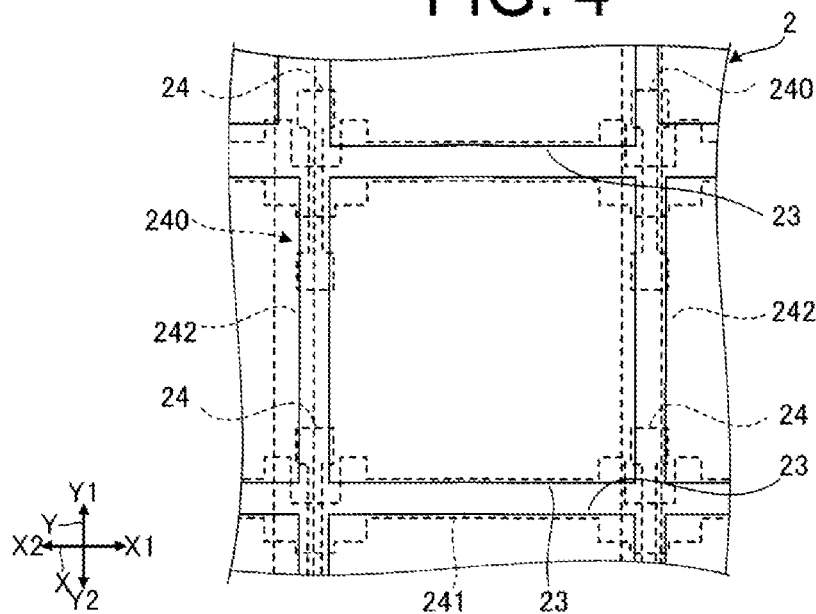
FIG. 5 is a plan view of the element substrate illustrated in FIG. 4.

FIG. 5 is a plan view of the element substrate 2 illustrated in FIG. 4. FIG. 5 corresponds to a line B-B in FIG. 4, with a portion of the spacer 6 omitted. The plurality of pixel electrodes 23 are spaced apart from each other and are disposed in rows and columns in the X1 direction and the Y2 direction. The plurality of transistors 24 and the light shielding portion 240 are disposed around the plurality of pixel electrodes 23 in plan view. The light shielding portion 240 is disposed in a grid pattern in plan view.

1Ac-2. Counter Substrate 3

As illustrated in FIG. 4, the counter substrate 3 includes the second substrate 30, the common electrode 35, and the second oriented film 36, as described above. The second substrate 30 includes a second base body 31, a light-transmitting layer 32, and an insulating layer 34. The second base body 31, the light-transmitting layer 32, the lens layer 33, the insulating layer 34, the common electrode 35, and the second oriented film 36 are stacked in this order in the Z2 direction.

The second base body 31 is a plate having translucency and insulating properties. The second base body 31 is, for example, a glass plate or a quartz plate.

The light-transmitting layer 32 has translucency and insulating properties. The light-transmitting layer 32 includes a plurality of recessed portions 321. The material of the light-transmitting layer 32 is, for example, an inorganic material such as silicon nitride and silicon oxide.

The lens layer 33 has translucency and insulating properties. The lens layer 33 has a plurality of lens sections 331. The plurality of lens sections 331 are disposed in a one-to-one manner at the plurality of recessed portions 321. The lens sections 331 are protruding portions that protrude in the Z1 direction from the insulating layer 34. The lens sections 331 have curved surfaces that function as lens surfaces. The curved surface contacts a recessed surface of the recessed portion 321. The material of the lens layer 33 is, for example, an inorganic material such as silicon nitride and silicon oxide.

The refractive index of the light-transmitting layer 32 and the refractive index of the lens layer 33 are different from each other. In the present exemplary embodiment, the refractive index of the light-transmitting layer 32 is less than the refractive index of the lens layer 33. Thus, the lens sections 331 focus the light incident on the second base body 31. In addition, the plurality of lens sections 331 are disposed in a one-to-one manner in the plurality of pixel electrodes 23. Also, although not illustrated in the drawings, the spacer 6 is disposed between the plurality of lens sections 331 in plan view. By having such lens sections 331, the efficiency of use of light can be increased compared to a case in which the lens sections 331 are not included. Thus, the liquid crystal device 100 having excellent brightness and display quality can be realized. Note that the lens layer 33 and the light-transmitting layer 32 may be omitted.

The insulating layer 34 has translucency and insulating properties. The material of the insulating layer 34 is, for example, an inorganic material such as silicon nitride and silicon oxide. Note that the insulating layer 34 may be omitted.

The common electrode 35 has translucency and conductivity. The common electrode 35 includes a transparent conductive material such as ITO, IZO, and FTO, for example.

The second oriented film 36 has translucency and insulating properties. The second oriented film 36 together with the first oriented film 25 orients the liquid crystal molecules 50 of the liquid crystal layer 5. The second oriented film 36 is disposed covering the common electrode 35. Examples of the material of the second oriented film 36 include inorganic materials such as silicon oxide.

1Ac-3. Spacer 6

Figure 6:
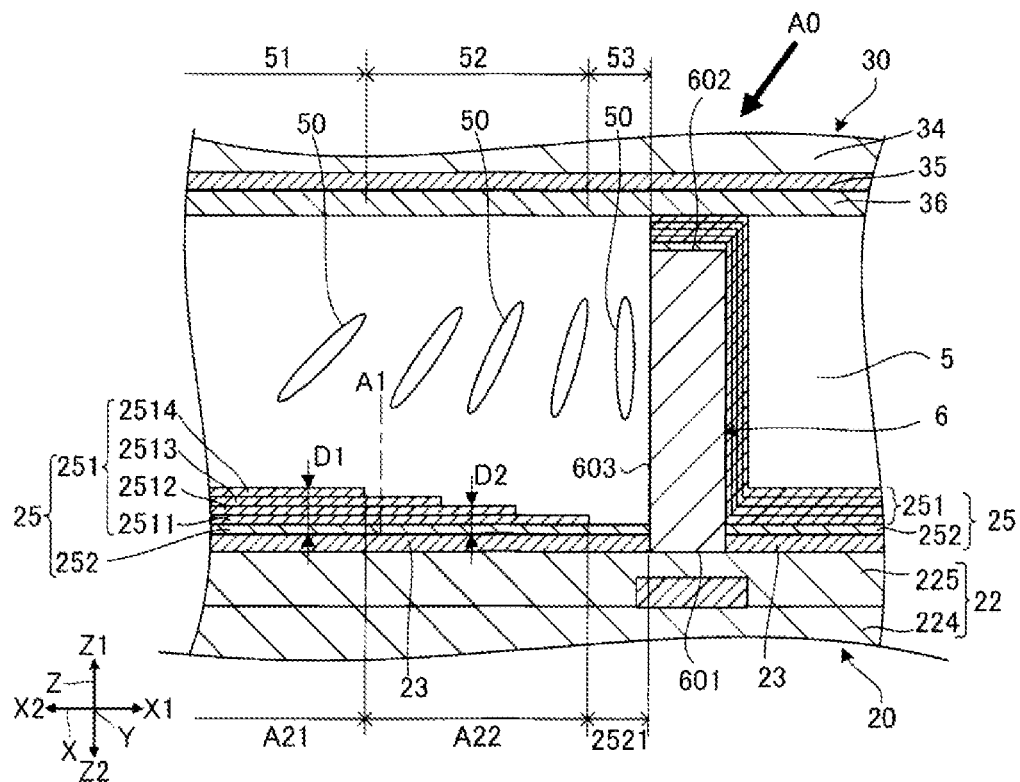
FIG. 6 is a view illustrating a spacer and a vicinity thereof in FIG. 4.

FIG. 6 illustrates the spacer 6 and a vicinity thereof in FIG. 4. As illustrated in FIG. 6, the plurality of spacers 6 are disposed between the first substrate 20 and the second substrate 30. Additionally, the plurality of spacers 6 are disposed within the liquid crystal layer 5. In the present exemplary embodiment, the spacer 6 is disposed at the first substrate 20. Additionally, the spacer 6 contacts the first substrate 20 and the pixel electrode 23. Note that in the example illustrated in FIG. 6, a portion of the spacer 6 is covered by the first oriented film 25, but the first oriented film 25 need not be disposed at the spacer 6.

Each spacer 6 is a columnar member. The spacer 6 defines a distance between the first substrate 20 and the second substrate 30. In other words, the spacer 6 defines the thickness of the liquid crystal layer 5. By having the spacer 6, changes in the distance between the first substrate 20 and the second substrate 30 over time can be suppressed compared to the case where there is no spacer 6.

The shape of each spacer 6 in cross-section is square. The spacer 6 has a first surface 601, a second surface 602, and a side surface 603. The first surface 601 is a surface of the spacer 6 located closest to the first substrate 20. The second surface 602 is a surface of the spacer 6 located closest to the second substrate 30. The side surface 603 couples the first surface 601 and the second surface 602. In the present exemplary embodiment, the side surface 603 is parallel to the Z1 direction. The width of the first surface 601 and the width of the second surface 602 are approximately equal. The width is the length in the X-Y plane.

Note that in the example illustrated in FIG. 6, the shape of each spacer 6 in a cross-sectional view is approximately square, but the shape is not limited to a square shape. For example, the shape may be trapezoidal, for example. In the example illustrated in FIG. 6, the overall shape of each spacer 6 is columnar, but the overall shape may be, for example, a wall shape.

Figure 7:
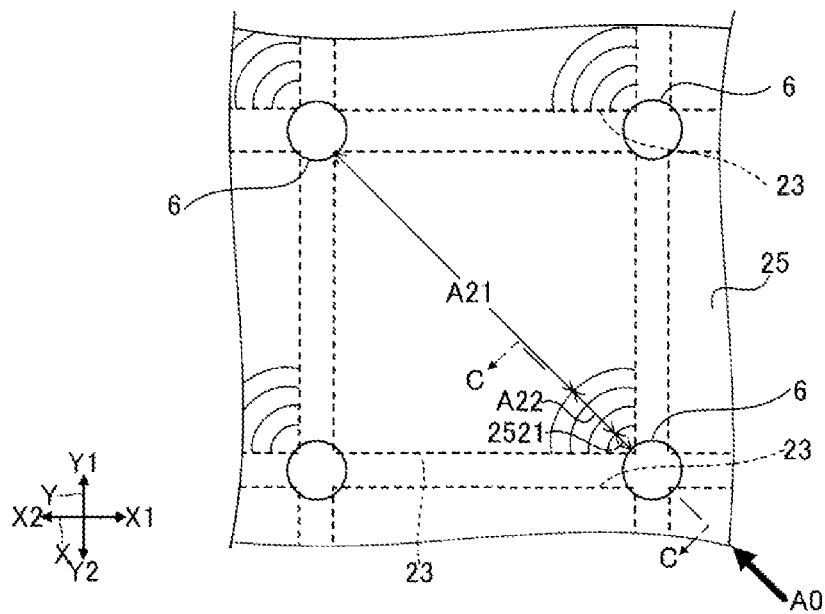
FIG. 7 is a plan view of the spacer illustrated in FIG. 4.

FIG. 7 is a plan view of the spacer 6 illustrated in FIG. 4. Note that the cross-sectional view of FIG. 6 corresponds to a line C-C in FIG. 7. As illustrated in FIG. 7, the plurality of spacers 6 are disposed in an island shape in plan view. The plurality of spacers 6 are disposed for each pixel pitch. Thus, the spacer 6 is disposed corresponding to each of the plurality of pixel electrodes 23. For example, with respect to the pixel electrode 23 located in the center in FIG. 7, the spacer 6 located at the right diagonal of the pixel electrode 23 corresponds the pixel electrode 23. By disposing the spacer 6 for each pixel electrode 23, it is possible to suppress variations in the distance between the first substrate 20 and the second substrate 30 for each pixel P. Note that the spacer 6 may be disposed for each of the plurality of pixels P.

In addition, each spacer 6 does not substantially overlap with the pixel electrode 23 in plan view. Specifically, each spacer 6 is located in a region between the plurality of pixel electrodes 23 in plan view. By disposing the spacer 6 at such a position, a reduction in the opening ratio caused by the presence of the spacer 6 can be suppressed. Note that a portion of the spacer 6 may overlap with the pixel electrode 23 in plan view. In this case, the proportion of the portion of the spacer 6 that overlaps with the pixel electrode 23 is preferably less than the proportion of the portion of the spacer 6 that does not overlap with the pixel electrode 23.

In the example illustrated in FIG. 7, the shape of each spacer 6 in plan view is substantially circular. However, the shape is not limited to a circular shape. The shape may be a polygon such as square and hexagonal, for example. In addition, the shape of the spacer 6 in plan view may be a line shape along the wiring included in the light shielding portion 240.

The spacer 6 has insulating properties. Additionally, in the present exemplary embodiment, the spacer 6 has translucency, but may not have translucency. Examples of the material of the spacer 6 include an inorganic material containing silicon such as silicon oxides such as silicon dioxide and silicon oxynitride. Since the material of the spacer 6 is an inorganic material, the dimensional accuracy of the spacer 6 can be particularly improved and the dimensional change over time can be made less likely to occur as compared to a case where the spacer 6 includes an organic material. Thus, the distance between the element substrate 2 and the counter substrate 3 can be stabilized over a long period of time. In addition, since the material of the spacer 6 is an inorganic material, deterioration of the liquid crystal layer 5 due to the invasion of the components of the organic material or the metal material into the liquid crystal layer 5 is suppressed. As a result, the risk of defects caused by the organic component or the metal component being mixed into the liquid crystal layer 5 can be suppressed. Thus, the life time of the liquid crystal device 100 can be extended.

Note that the spacer 6 may include an organic material or a metal material. Additionally, the spacer 6 may be constituted by a single layer or a plurality of layers. However, when the spacer 6 is constituted by the single layer, the spacer 6 is easier to manufacture as compared to a case where the spacer 6 is constituted by the plurality of layers.

1Ad. First Orientated Film 25

As illustrated in FIG. 6, the first oriented film 25 is disposed at the plurality of pixel electrodes 23. In the present exemplary embodiment, the first oriented film 25 covers a portion of the spacer 6. Specifically, the first oriented film 25 covers a portion of the second surface 602 and the side surface 603 of the spacer 6. In addition, the first oriented film 25 includes a first vapor deposition film 251 and a second vapor deposition film 252. As described below, the first vapor deposition film 251 and the second vapor deposition film 252 are formed by depositing a vapor deposition substance PO at a substrate surface of the element substrate 2 or the counter substrate 3, as described below. In the present exemplary embodiment, vertical vapor deposition is used at which the vapor deposition substance PO is incident in a direction perpendicular to the substrate surface, that is, in a direction parallel to the normal direction, as well as oblique vapor deposition is used at which the vapor deposition substance PO is incident in an oblique direction from the normal direction, which is a direction perpendicular to the substrate surface. The first vapor deposition film 251 is an example of a "vapor deposition film".

The second vapor deposition film 252 is disposed between and in contact with the first vapor deposition film 251 and the plurality of pixel electrodes 23. The second vapor deposition film 252 is also deposited at the second surface 602 of the spacer 6. The second vapor deposition film 252 is a vertical vapor deposition film formed by the vertical vapor deposition. In the vertical vapor deposition, the incident direction of the vapor deposition substance PO is perpendicular to the surface of the vapor deposited object and parallel to the normal line. In the present exemplary embodiment, a vapor deposition angle, which is an incident angle of the vapor deposition substance PO, is approximately 0° with respect to a direction parallel to the normal line. The vertical vapor deposition film is not likely to be deposited at the side surface 603 of the spacer 6, but a shadow region of the spacer 6 does not easily occur. In the present exemplary embodiment, in the vertical vapor deposition, the shadow region of the spacer 6 does not occur in the pixel electrode 23, and thus the first vapor deposition film 251 is deposited over the pixel electrode 23 uniformly.

The first vapor deposition film 251 is disposed between and in contact with the second vapor deposition film 252 and the liquid crystal layer 5. The first vapor deposition film 251 is also deposited at a portion of the side surface 603 and the second surface 602 of the spacer 6. The first vapor deposition film 251 is an oblique vapor deposition film formed by the oblique vapor deposition. In the oblique vapor deposition, the incident direction of the vapor deposited object PO is a direction inclined with respect to a surface of the vapor deposited object, and is a direction inclined from the normal direction of the substrate surface. In the present exemplary embodiment, the vapor deposition angle, which is the incident angle of the vapor deposition substance PO, is greater than 0° and less than 45° with respect to a direction parallel to the normal line. The oblique vapor deposition film is also deposited at a portion of the side surface 603 of the spacer 6, but a shadow region of the spacer 6 occurs. In the present exemplary embodiment, in the oblique vapor deposition, the shadow region of the spacer 6 occurs in the pixel electrode 23, and the second vapor deposition film 252 is difficult to uniformly cover the pixel electrode 23 near the pixel spacer 6.

The first vapor deposition film 251 is formed while changing the vapor deposition angle stepwise. In the present exemplary embodiment, the first vapor deposition film 251 is formed while changing the vapor deposition angle to four stages. Thus, the first vapor deposition film 251 is constituted by four layers. Specifically, the first vapor deposition film 251 includes a plurality of films 2511, 2512, 2513, and 2514. The plurality of films 2511, 2512, 2513, and 2514 are stacked in this order from the second vapor deposition film 252. The vapor deposition angle is increased in the order of the films 2511, 2512, 2513, and 2514.

The gradual change in the vapor deposition angle changes the distance between each film and the spacer 6. This is because an area of the shadow of the spacer 6 changes during the oblique vapor deposition. For example, when the vapor deposition substance PO is incident while changing the incident angle from an arrow A0 direction illustrated in FIG. 6, a portion of the second vapor deposition film 252 located on the left side of the spacer 6 in FIG. 7 is a shadow of the spacer 6. As a result, the first vapor deposition film 251 is not formed at a portion of the second vapor deposition film 252 located on the left side of the spacer 6 in FIG. 7.

Additionally, the greater the incident angle, the greater the area of the shadow of the spacer 6. As described above, the vapor deposition angle is increased in the order of the films 2511, 2512, 2513, and 2514. Thus, the distances between the films 2511, 2512, 2513, 2514 and the spacer 6 are greater in this order. Thus, the positions of each end of the films 2511, 2512, 2513, and 2514 are further from the spacer 6 in this order. Note that since the second vapor deposition film 252 is formed by the vertical vapor deposition, the end of the second vapor deposition film 252 contacts the spacer 6.

Since the area shadowed by the spacer 6 changes in accordance with the incident angle, a portion of the film 2511 is not covered by the film 2512 and contacts the liquid crystal layer 5. The portion of the film 2512 is not covered by the film 2513 and contacts the liquid crystal layer 5. Note that the film 2514 contacts the liquid crystal layer 5. Furthermore, a portion of the second vapor deposition film 252 includes a portion 2521 that is not covered by the first vapor deposition film 251. The portion 2521 contacts the liquid crystal layer 5.

In addition, the first vapor deposition film 251 is formed while changing the vapor deposition angle stepwise, and thus has a first region A21 having a constant film thickness and a second region A22 having a varying thickness in a stepwise manner. The first region A21 is the region most responsible for image display. The first region A21 has the films 2511, 2512, 2513, and 2514. An average thickness D1 of the first region A21 is substantially constant. For example, the film thicknesses of the films 2511, 2512, 2513, and 2514 are each approximately 10 nm, and the average thickness D1 of the first region A21 is 40 nm.

The second region A22 is a region in which the film 2514 is not present. As illustrated in FIGS. 6 and 7, in the second region A22, the thickness increases gradually from the spacer 6 toward the center of the pixel electrode 23 corresponding to the spacer 6. An average thickness D2 of the second region A22 is less than the average thickness D1 of the first region A21. For example, the film thicknesses of the films 2511, 2512, and 2513 are approximately 10 nm, and the average thickness D2 of the second region A22 is 30 nm. As illustrated in FIG. 7, the second region A22 is located between the first region A21 and the spacer 6 in plan view. More specifically, the second region A22 is located between the first region A21 and the portion 2521 in plan view. Note that the portion 2521 is located between the second region A22 and the spacer 6 in plan view.

Figure 8:
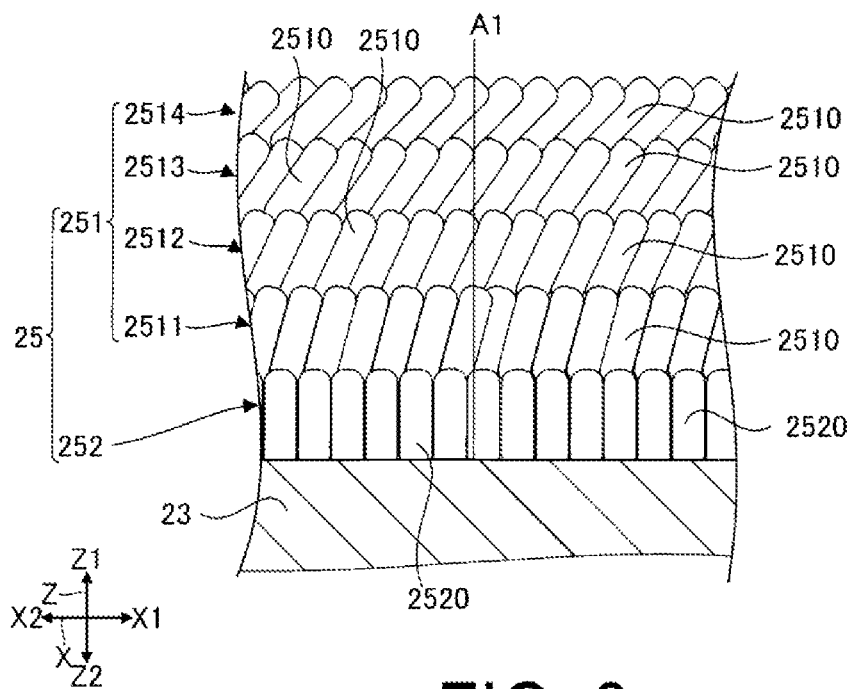
FIG. 8 is an enlarged schematic view of a first oriented film illustrated in FIG. 6.

FIG. 8 is an enlarged schematic view of the first oriented film 25 illustrated in FIG. 6. In FIG. 8, "A1" indicates a normal line to the element substrate 23 and is parallel to the Z-axis. As illustrated in FIG. 8, the second vapor deposition film 252 includes a plurality of second columns 2520. The second columns 2520 are columnar crystals along the normal line A1 to the surface of the pixel electrode 23. The second columns 2520 are formed by aggregation of molecules by interaction between molecules of the vapor deposition substance.

The first vapor deposition film 251 has a plurality of first columns 2510. The first columns 2510 are an example of a "column." The first columns 2510 are inclined with respect to the normal line A1. The first columns 2510 are columnar crystals formed by the interaction of molecules between molecules of the vapor deposition substance PO, similar to the second columns 2520.

Since the first vapor deposition film 251 is formed while changing the vapor deposition angle stepwise, the inclination angle of each of the first columns 2510 included in the films 2511, 2512, 2513, and 2514 with respect to the normal line A1 is different from each other. Specifically, since the vapor deposition angle increases in the order of the films 2511, 2512, 2513, and 2514, the inclination angle of the first columns 2510 included in each of the films 2511, 2512, 2513, and 2514 increases in this order. Thus, in the second region A22 illustrated in FIGS. 6 and 7, the inclination angle of the first columns 2510 with respect to the normal line A1 increases from the spacer 6 toward the center of the pixel electrode 23. Also, the inclination angle of the first columns 2510 present in the first region A21 is greater than the inclination angle of the first columns 2510 present in the second region A22. Note that the inclination angle is an angle formed between a long axis of the first columns 2510 and the normal line A1.

Here, a pretilt angle of the liquid crystal molecules 50 included in the liquid crystal layer 5 changes depending on the first columns 2510 and the second columns 2520. Specifically, in the second region A22, the pretilt angle of the liquid crystal molecules 50 increases gradually from the spacer 6 toward the center of the pixel electrode 23.

As illustrated in FIG. 6, the liquid crystal layer 5 includes a first portion 51, a second portion 52, and a third portion 53. The first portion 51 corresponds to the first region A21. Specifically, the first portion 51 overlaps with the first region A21 in plan view. The second portion 52 corresponds to the second region A22. Specifically, the second portion 52 overlaps with the second region A22 in plan view. The third portion 53 corresponds to the portion 2521 of the second vapor deposition film 252. Specifically, the third portion 53 overlaps with the portion 2521 of the second vapor deposition film 252 in plan view. The pretilt angle of the liquid crystal molecules 50 present in the first portion 51 is greater than the pretilt angle of the liquid crystal molecules 50 present in the second portion 52. The pretilt angle of the liquid crystal molecules 50 present in the second portion 52 is greater than the pretilt angle of the liquid crystal molecules 50 present in the third portion 53.

As described above, the first vapor deposition film 251 included in the first oriented film 25 is formed while changing the vapor deposition angle, as described above. As such, the first vapor deposition film 251 includes the first region A21 and the second region A22 having a film thickness less than the film thickness of the first region A21. The average thickness D2 of the second region A22 is less than the average thickness D1 of the first region A21. Thus, compared to a case where the second region A22 is not present, the orientation of the liquid crystal molecules 50 is prevented from becoming discontinuous between a location where the first vapor deposition film 251 formed by the oblique vapor deposition is present and a location where the first vapor deposition film 251 is not present. As a result, light leakage at the location where the first vapor deposition film 251 is not present is suppressed. In other words, the presence of the second region A22 makes an orientation angle of the liquid crystal molecules 50 continuous compared to a case where the second region A22 is not present, whereby the light leakage at the location where the first vapor deposition film 251 is not present can be suppressed.

Thus, a reduction in display quality can be suppressed since the image defects are suppressed from standing out.

As described above, the liquid crystal layer 5 includes the first portion 51 corresponding to the first region A21 and the second portion 52 corresponding to the second region A22. The inclination angle of the first columns 2510 in the first region A21 is greater than the inclination angle of the first columns 2510 in the second region A22, so that the pretilt angle of the first portion 51 is greater than the pretilt angle of the second portion 52. Therefore, the discontinuity of the orientation of the liquid crystal molecules 50 is suppressed as compared to a case where the second portion 52 is not present. Thus, the light leakage at the location where the first vapor deposition film 251 is not present can be suppressed.

Note that the specific value of the inclination angle of the first columns 2510 is not particularly limited and is set in accordance with the pretilt angle of the liquid crystal molecules 50. For example, since the first region A21 is the region most responsible for the image display, the inclination angle of the first columns 2510 in the film 2514 is set in accordance with the display characteristics. On the other hand, the inclination angles of the first columns 2510 in the films 2511, 2512, and 2513 are set to be less than the inclination angle of the first columns 2510 in the film 2514 so as to suppress the discontinuity in the orientation of the liquid crystal molecules 50 between the location where the first vapor deposition film 251 is present and the location where the first vapor deposition film 251 is not present.

Figure 9:
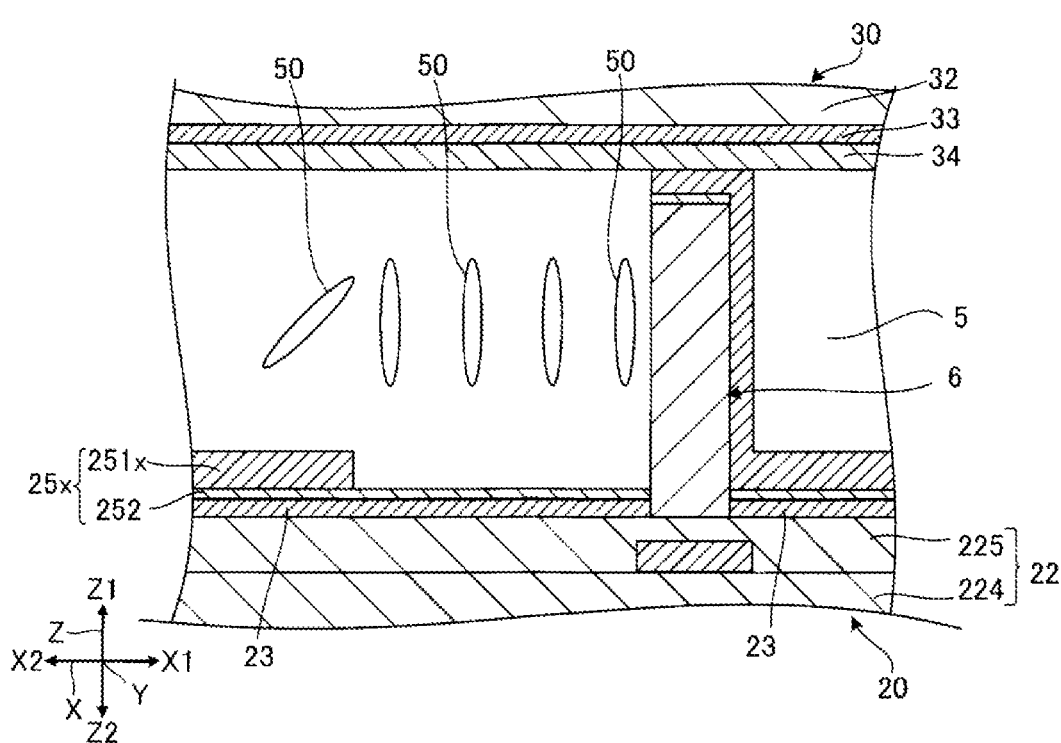
FIG. 9 is a diagram illustrating a first oriented film of a reference example.

FIG. 9 is a diagram illustrating a first oriented film 25x of a reference example. A thickness of a first vapor deposition film 251x included in the first oriented film 25x in FIG. 9 is constant. Although not illustrated, the inclination angle of the first columns 2510 included in the first vapor deposition film 251x is equal to the inclination angle of the film 2514 illustrated in FIG. 8. In the example illustrated in FIG. 9, there is no location corresponding to the second region A22. In other words, the thickness of the first vapor deposition film 251x is constant, and the first vapor deposition film 251x does not have two regions with different thicknesses. As a result, the orientation of the liquid crystal molecules 50 is discontinuous between a location where the first vapor deposition film 251x is present and a location where the first vapor deposition film 251x is not present. Thus, image defects are noticeable.

As described above, in the present exemplary embodiment, the first vapor deposition film 251 illustrated in FIG. 6 includes the plurality of films 2511, 2512, 2513, and 2514. The inclination angles of the first columns 2510 of the plurality of films 2511, 2512, 2513, and 2514 with respect to the normal line A1 are different from each other. Specifically, the inclination angle increases away from the spacer 6. Thus, the light leakage at the location where the first vapor deposition film 251 is not present can be suppressed.

Note that the first vapor deposition film 251 may have at least two films with different inclination angles of the first columns 2510, but a number of films included in the first vapor deposition film 251 is preferably 3 or more. As a result, the orientation angle of the liquid crystal molecules 50 is more continuous, whereby the light leakage at the location where the first vapor deposition film 251 is not present can be suppressed.

As described above, the first oriented film 25 has the second vapor deposition film 252 that includes the second columns 2520. The second vapor deposition film 252 includes the portion 2521 that is located between the second region A22 and the spacer 6 without overlapping with the first vapor deposition film 251 in plan view. By providing the second vapor deposition film 252 having the portion 2521, the pixel electrode 23 is prevented from being exposed to the liquid crystal layer 5. As a result, the possibility of deterioration of the liquid crystal layer 5 due to the influence of the components included in the pixel electrode 23 can be avoided. Thus, by providing the second vapor deposition film 252, display quality can be increased compared to a case where the second vapor deposition film 252 is not provided.

1Ae. Manufacturing Method of Liquid Crystal Device 100

Figure 10:
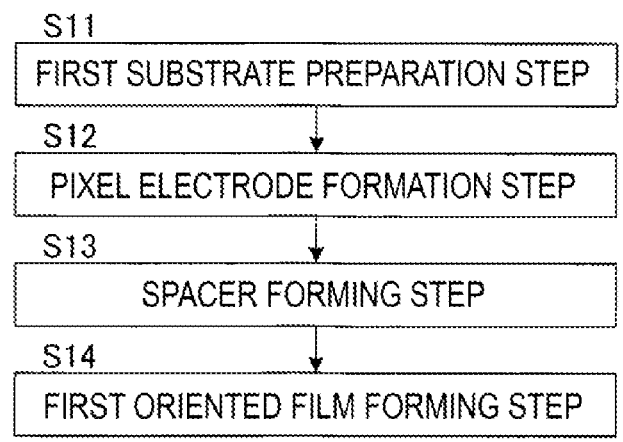
FIG. 10 is a diagram illustrating a flow of a manufacturing method of the liquid crystal device according to the first exemplary embodiment.

FIG. 10 is a diagram illustrating a flow of a manufacturing method of the liquid crystal device 100 according to the first exemplary embodiment. In FIG. 10, the manufacturing method of the element substrate 2 and the spacer 6 is mainly illustrated in the manufacturing step of the liquid crystal device 100. Note that the structure of the liquid crystal device 100 other than the element substrate 2 and the spacer 6 is manufactured by a known method, for example.

As illustrated in FIG. 10, the manufacturing method of the element substrate 2 and the spacer 6 includes a first substrate preparation step S11, a pixel electrode forming step S12, a spacer forming step S13, and a first oriented film forming step S14. In the first substrate preparation step S11, the first substrate 20 is formed. The first substrate 20 is manufactured by a known method, for example.

Figure 11:
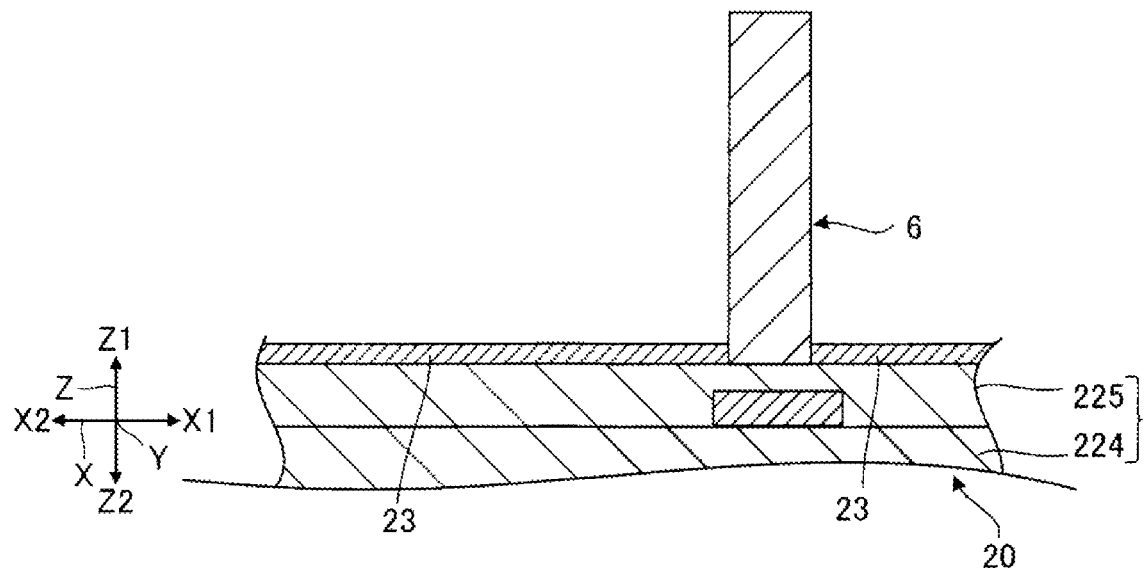
FIG. 11 is a diagram illustrating a pixel electrode forming step and a spacer forming step.

FIG. 11 is a diagram illustrating the pixel electrode forming step S12 and the spacer forming step S13, and is a cross-sectional view corresponding to FIG. 6. The pixel electrode forming step S12 includes forming the plurality of pixel electrodes 23. Specifically, after a layer formed from the transparent electrode material is formed at the first substrate 20 by a CVD (chemical vapor deposition) method, for example, and then the layer is patterned using a mask. As a result, the plurality of pixel electrodes 23 illustrated in FIG. 11 are formed.

In the spacer forming step S13, the plurality of spacers 6 are formed. Specifically, after a layer formed from the inorganic material is formed at the first substrate 20 by a vapor deposition method such as CVD at the stack body 22, for example, and then the layer is patterned using a mask. As a result, the spacer 6 illustrated in FIG. 11 is formed.

Figure 12:
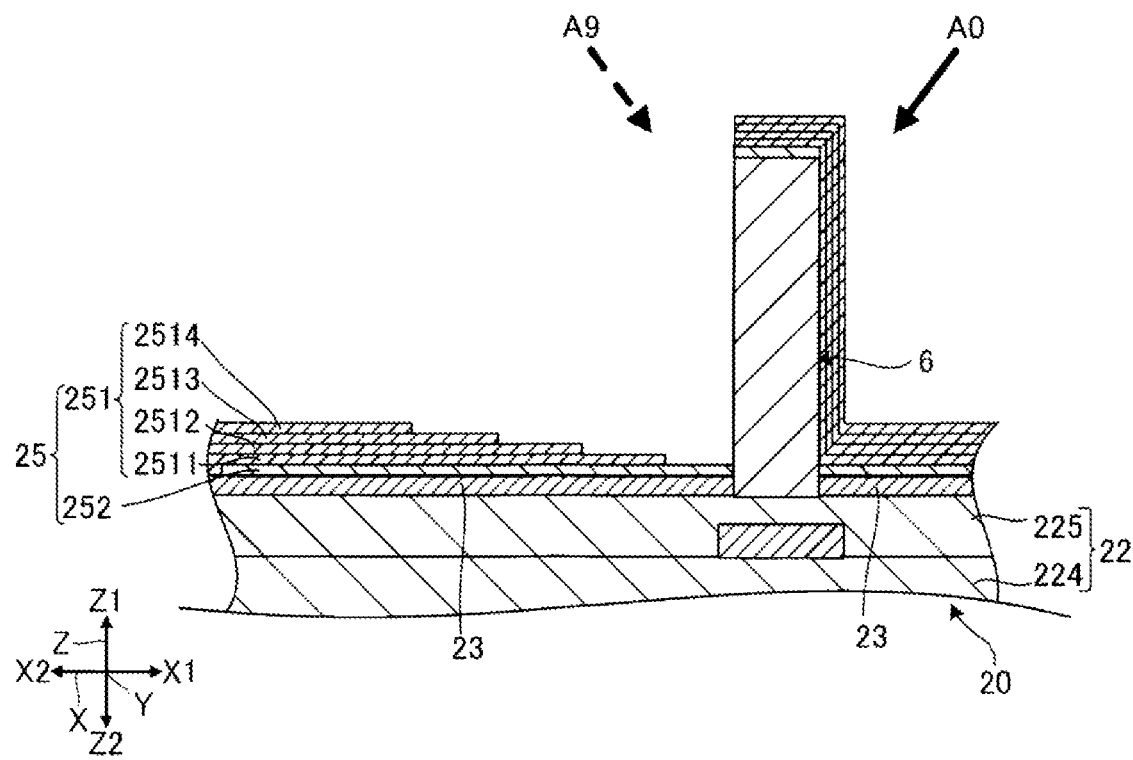
FIG. 12 is a diagram illustrating a first oriented film forming step.

FIG. 12 is a diagram illustrating the first oriented film forming step S14. In the first oriented film forming step S14, as illustrated in FIG. 12, the first oriented film 25 is formed at the pixel electrode 23 and the spacer 6 by a vapor deposition method such as a PVD (Physical Vapor Deposition) method, for example. The PVD method includes vacuum deposition, sputtering, and ion plating methods that do not use ion beams such as electron beam type and resistive heating type. In the formation of the first oriented film 25, the first vapor deposition film 251 is formed by the vertical vapor deposition, and then the second vapor deposition film 252 is formed by the oblique vapor deposition.

Figure 13:
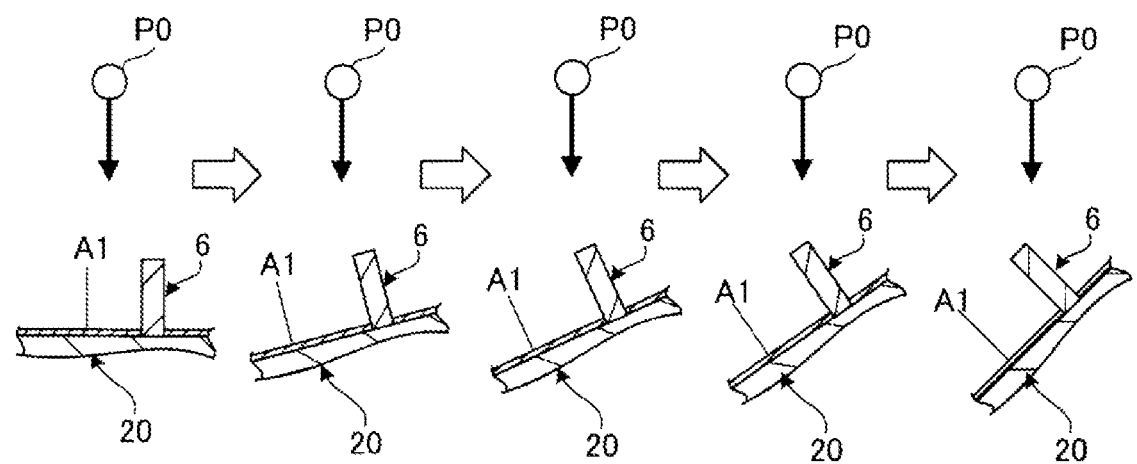
FIG. 13 is a diagram illustrating vapor deposition in the first oriented film forming step.

FIG. 13 is a diagram illustrating the vapor deposition in the first oriented film forming step S14. As illustrated in FIG. 13, the vertical vapor deposition and the oblique vapor deposition are performed continuously. In the oblique vapor deposition, the vapor deposition substance P0 is incident on the first substrate 20 from a direction inclined with respect to the normal line A1. Specifically, the vapor deposition angle is changed over time from 0° to a predetermined angle of less than 45° with respect to the normal line A1. More specifically, the vapor deposition angle is changed so that the vapor deposition angle increases over time from 0° to the predetermined angle of less than 45°. Note that the vapor deposition angle is the incident angle of the vapor deposition substance P0 with respect to the normal line A1. Furthermore, the predetermined angle is not particularly limited as long as the predetermined angle is greater than 0° and less than 45°, and is set in accordance with the intended pretilt angle, for example.

Further, in the present exemplary embodiment, the vapor deposition substance P0 is incident on the first substrate 20 while the first substrate 20 is rotated stepwise with respect to the incident direction of the vapor deposition substance P0 so that the vapor deposition angle increases for each predetermined time. In addition, in the present exemplary embodiment, the vapor deposition angle changes to four stages. By performing the oblique vapor deposition while changing the vapor deposition angle stepwise, the first vapor deposition film 251 having four films of the films 2511, 2512, 2513, and 2514 is formed as illustrated in FIG. 12.

As described above, the element substrate 2 and the spacer 6 are formed. As described above, in the oblique vapor deposition in the manufacturing of the first oriented film 25, the vapor deposition angle is changed so that the vapor deposition angle increases over time from 0° to the predetermined angle of less than 45° with respect to the normal line A1 to the surface of the pixel electrode 23. Thus, as described above, the first region A21 having the average thickness D1 and the second region A22 having the average thickness D2 less than the average thickness D1 are formed.

Also, in the exemplary embodiment, the vapor deposition angle is changed stepwise. Thus, the plurality of films 2511, 2512, 2513, and 2514 having different inclination angles of the first columns 2510 are formed. Then, a portion of each of the films 2511, 2512, and 2513 is exposed. Thus, in the second region A22, the inclination angle of the first columns 2510 increases continuously from the spacer 6 toward the center of the pixel electrode 23. As a result, the orientation angle of the liquid crystal molecules 50 changes continuously, whereby the light leakage at the location where the first vapor deposition film 251 is not present can be suppressed.

In addition, the oblique vapor deposition in the production of the first oriented film 25 described above is performed in one direction with respect to the spacer 6. Thus, the oblique vapor deposition is not performed on the spacer 6 from one direction and is not performed from a direction opposite to the one direction. In other words, as illustrated in FIG. 12, the vapor deposition substance is incident from the arrow A0 direction, but the vapor deposition substance is not incident from an arrow A9 direction. Therefore, the oblique vapor deposition in the production of the first oriented film 25 is not performed a plurality of times. Thus, the manufacturing time of the first oriented film 25 can be shortened.

1B. Second Exemplary Embodiment

A second exemplary embodiment will be described. Note that, for the elements having the same functions as those of the first exemplary embodiment in each of the following examples, the reference numerals used in the description of the first exemplary embodiment will be diverted and detailed description of each will be omitted as appropriate.

Figure 14:
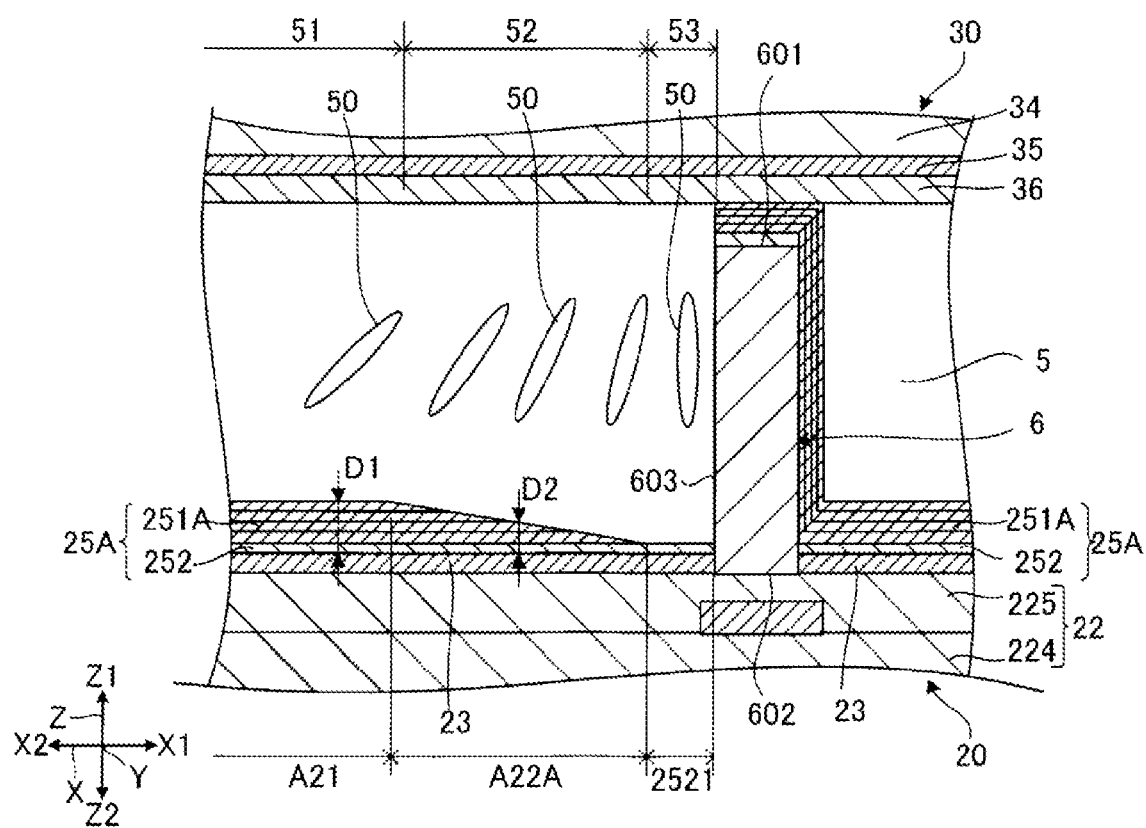
FIG. 14 is a cross-sectional view illustrating a first oriented film in a second exemplary embodiment.

FIG. 14 is a cross-sectional view illustrating a first oriented film 25A according to the second exemplary embodiment. The first oriented film 25A of the present exemplary embodiment includes a first vapor deposition film 251A instead of the first vapor deposition film 251. In the following, regarding the first vapor deposition film 251A, matters different from the first vapor deposition film 251 of the first exemplary embodiment will be described, and descriptions of the same matter will be omitted as appropriate.

The first vapor deposition film 251A illustrated in FIG. 14 is formed while gradually changing the vapor deposition angle. More specifically, the first vapor deposition film 251A is formed while changing the vapor deposition angle so that the vapor deposition angle increases over time from 0° to a predetermined angle of less than 45°. The first vapor deposition film 251A includes the first region A21 having a constant thickness, and the second region A22A that varies gradually in thickness. In the second region A22A, the thickness thereof increases gradually from the spacer 6 toward the center of the pixel electrode 23 corresponding to the spacer 6. In the second region A22A, the inclination angle of the first columns 2510 increases gradually from the spacer 6 toward the center of the pixel electrode 23. Thus, in the second portion 52 of the liquid crystal layer 5, the pretilt angle of the liquid crystal molecules 50 increases gradually from the spacer 6 toward the center of the pixel electrode 23.

In the present exemplary embodiment as well, similar to the first exemplary embodiment, the first vapor deposition film 251A of the first oriented film 25A is formed while changing the vapor deposition angle. As such, the first vapor deposition film 251A has the first region A21 having the average thickness D1 and the second region A22 having the average thickness D2 less than the average thickness D1. Thus, compared to a case where the second region A22 is not present, the orientation of the liquid crystal molecules 50 is prevented from becoming discontinuous between a location where the first vapor deposition film 251A formed by the oblique vapor deposition is present and a location where the first vapor deposition film 251A is not present. As a result, the light leakage at the location where the first vapor deposition film 251A is not present is suppressed. In other words, the presence of the second region A22A makes an orientation angle of the liquid crystal molecules 50 continuous compared to a case where the second region A22A is not present, whereby the light leakage at the location where the first vapor deposition film 251A is not present can be suppressed. Thus, a reduction in display quality can be suppressed since the image defects are suppressed from standing out.

As described above, the first vapor deposition film 251A is formed while gradually changing the vapor deposition angle. Thus, the inclination angle of the first columns 2510 with respect to the normal line A1 changes gradually. Thus, compared to the first exemplary embodiment, the orientation angle of the liquid crystal molecules 50 is even more continuous, whereby the light leakage at the location where the first vapor deposition film 251A is not present can be further suppressed.

2. Modification Example

Each of the exemplary embodiments exemplified above can be variously modified. Specific modification aspects applied to each of the exemplary embodiments described above are exemplified below. Two or more modes freely selected from exemplifications below can be appropriately used in combination as long as mutual contradiction does not arise. Modification examples on the first exemplary embodiment that follow may be adapted to other exemplary embodiments to the extent that they do not conflict.

In each of the foregoing exemplary embodiments, the element substrate 2 has the spacer 6, but the counter substrate 3 may have the spacer 6.

Figure 15:
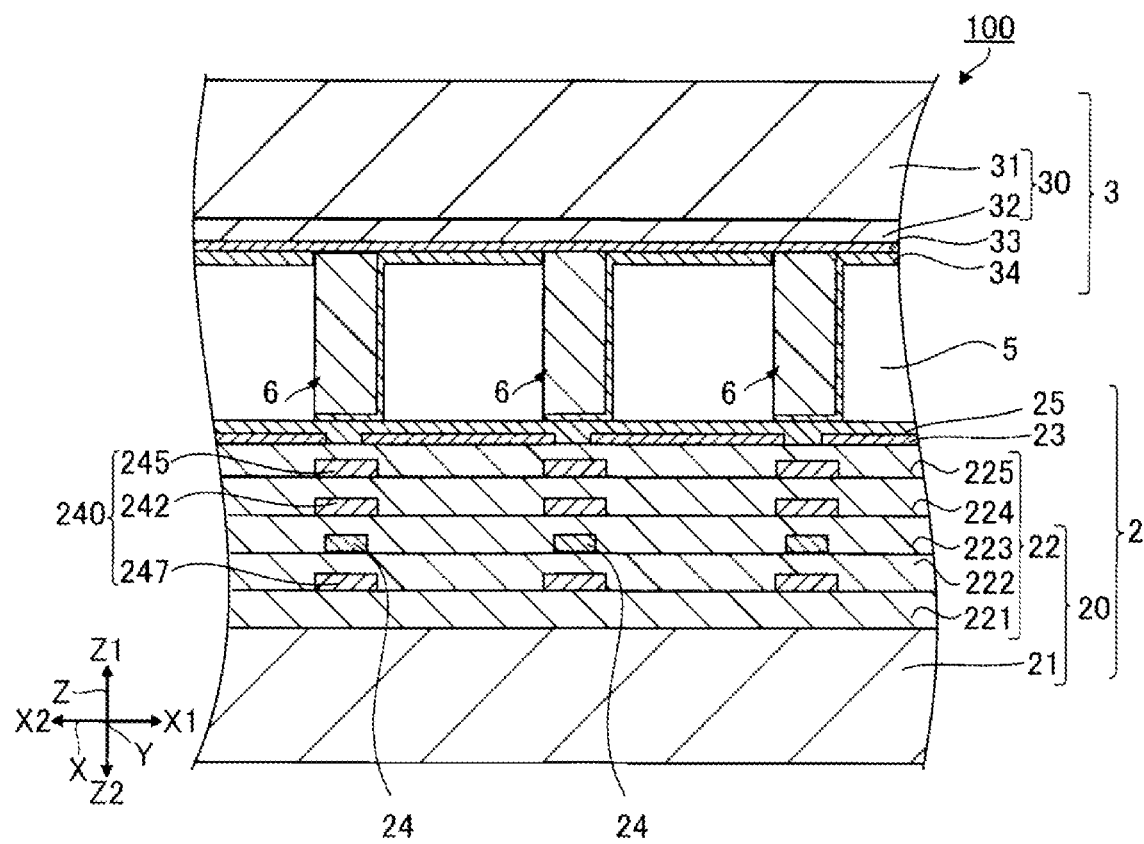
FIG. 15 is a cross-sectional view illustrating a portion of a liquid crystal device in a modification example.

FIG. 15 is a cross-sectional view illustrating a portion of the liquid crystal device 100 in the modification example. In the example illustrated in FIG. 15, the counter substrate 3 has the spacer 6. The spacer 6 is disposed between and in contact with the common electrode 35 and the second orientation film 36. In this case, the second oriented film 36 corresponds to the "oriented film", and the common electrode 35 corresponds to the "electrode". Thus, in this case, the second oriented film 36 has the vapor deposition film formed while changing the vapor deposition angle so that the vapor deposition angle increases over time from 0° to a predetermined angle of less than 45°. In addition, in this case, the second oriented film 36 has the first region and the second region having an average thickness less than the average thickness of the first region.

In each of the above-described exemplary embodiments, the transistor 24 is a TFT, but may be, for example, a MOSFET (metal-oxide-semiconductor field-effect transistor).

In each of the exemplary embodiments described above, an active matrix type liquid crystal device 100 is illustrated, but the driving method of the liquid crystal device 100 may be a passive matrix type, etc., for example.

The driving method of the "liquid crystal device" is not limited to a vertical electric field method, and may be a lateral electric field method. In the first exemplary embodiment, the pixel electrodes 23 are provided at the element substrate 2, and the common electrode 35 is provided at the counter substrate 3. However, an electrode for applying an electric field to the liquid crystal layer 5 may be provided at only one of the element substrate 2 and the counter substrate 3. Examples of the lateral electric field method include an IPS (In Plane Switching) mode. Furthermore, examples of the vertical electric field method include a TN (Twisted Nematic) mode, a VA (Vertical Alignment), a PVA mode, and an OCB (Optically Compensated Bend) mode.

3. Electronic Apparatus

The liquid crystal device 100 can be used for various electronic apparatuses.

Figure 16:
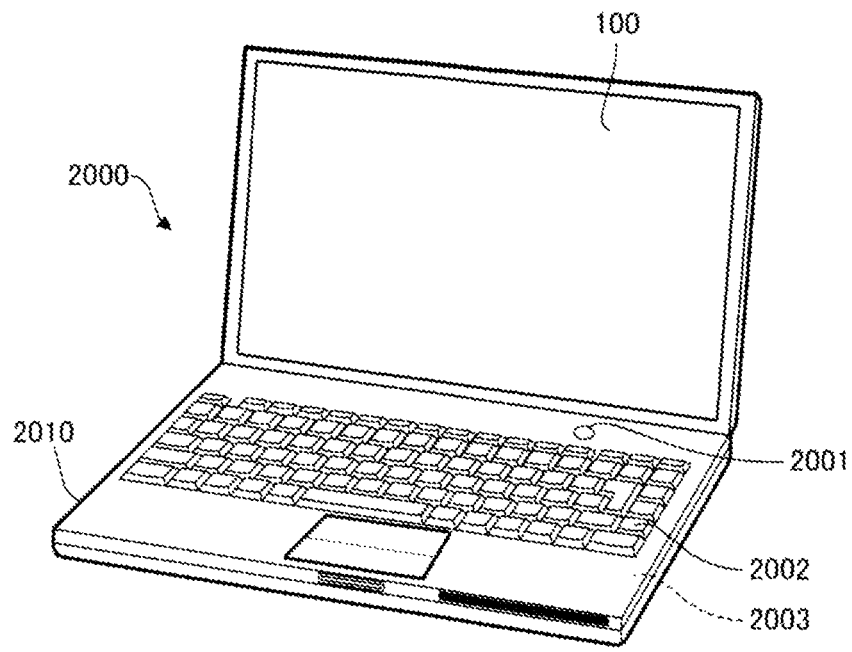
FIG. 16 is a perspective view illustrating a personal computer as an example of an electronic apparatus.

FIG. 16 is a perspective view illustrating a personal computer 2000 as an example of the electronic apparatus. The personal computer 2000 includes the liquid crystal device 100 that displays various images, a main body unit 2010 in which a power switch 2001 and a keyboard 2002 are installed, and a control unit 2003. The control unit 2003 includes a processor and a memory, for example, to control the operation of the liquid crystal device 100.

Figure 17:
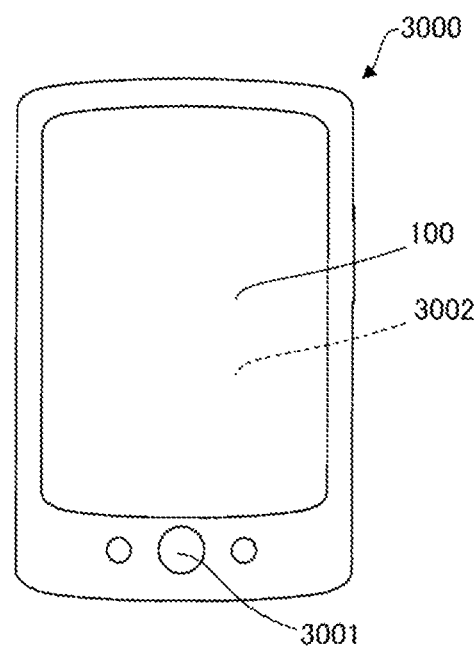
FIG. 17 is a plan view illustrating a smart phone as an example of the electronic apparatus.

FIG. 17 is a front view illustrating a smart phone 3000 as an example of the electronic apparatus. The smartphone 3000 includes an operation button 3001, the liquid crystal device 100 that displays various images, and a control unit 3002. The screen contents displayed on the liquid crystal device 100 are changed in accordance with the operation of the operation button 3001. The control unit 3002 includes a processor and a memory, for example, to control the operation of the liquid crystal device 100.

Figure 18:
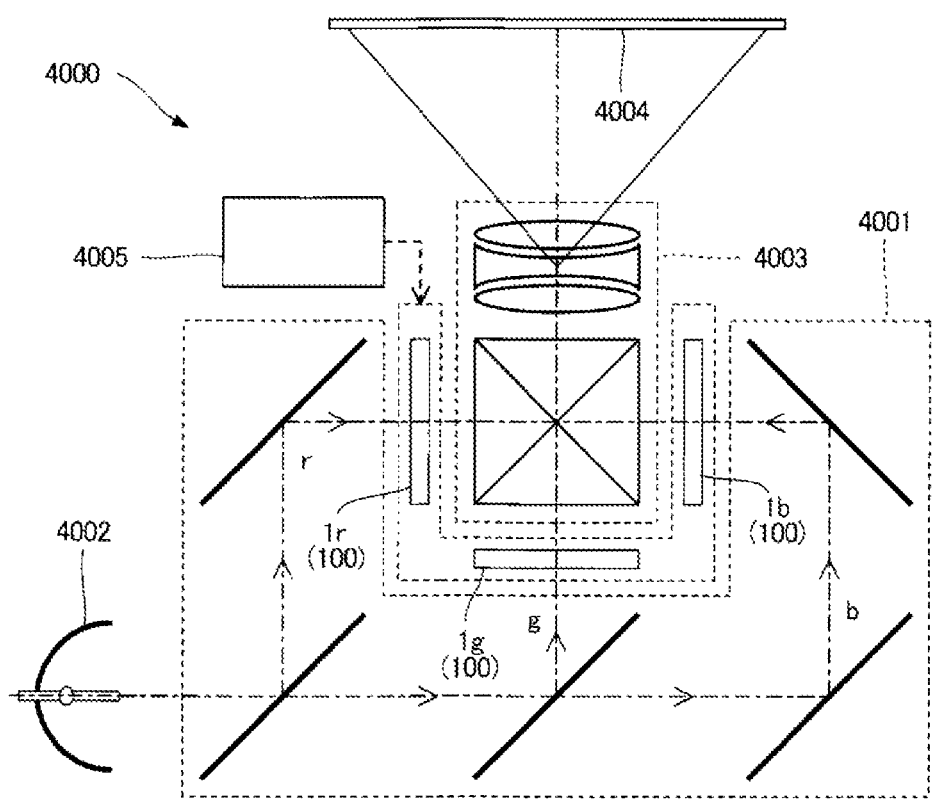
FIG. 18 is a schematic diagram illustrating a projector as an example of the electronic apparatus.

FIG. 18 is a schematic diagram illustrating a projector as an example of the electronic apparatus. A projection-type display device 4000 is a three-plate type projector, for example. A liquid crystal device 1r is a liquid crystal device 100 corresponding to a red display color, a liquid crystal device 1g is a liquid crystal device 100 corresponding to a green display color, and a liquid crystal device 1b is a liquid crystal device 100 corresponding to a blue display color. Specifically, the projection-type display device 4000 includes three liquid crystal devices 1r, 1g, and 1b that respectively correspond to display colors of red, green, and blue. A control unit 4005 includes a processor and a memory, for example, to control the operation of the liquid crystal device 100.

An illumination optical system 4001 supplies a red element r of light emitted from an illumination device 4002 as a light source to the liquid crystal device 1r, a green element g of the light to the liquid crystal device 1g, and a blue element b of the light to the liquid crystal device 1b. Each of the liquid crystal devices 1r, 1g, and 1b functions as an optical modulator, such as a light bulb, that modulates respective rays of the monochromatic light supplied from the illumination optical system 4001 depending on display images. A projection optical system 4003 combines the rays of the light emitted from each of the liquid crystal devices 1r, 1g, and 1b to project the combined light to a projection surface 4004.

The electronic apparatus described above includes the liquid crystal device 100 and the control units 2003, 3002, or 4005. Since the liquid crystal device 100 is prevented from noticeable light leakage, so-called black floating is reduced. Accordingly, by providing the liquid crystal device 100, the display quality of the personal computer 2000, the smartphone 3000, or the projection-type display device 4000 can be increased.

Note that the electronic apparatus to which the liquid crystal device of the present disclosure is applied is not limited to the apparatus illustrated, and may be, for example, a PDA (Personal Digital Assistant), a digital still camera, a television, a video camera, a car navigation device, an on-board indicator, an electronic organizer, an electronic paper, a calculator, a word processor, a workstation, a television phone, and POS (Point of Sale) terminal, etc. Further, examples of the electronic apparatus to which the present disclosure is applied include a printer, a scanner, a copier, a video player, a device provided with a touch panel, etc.

Although the present disclosure has been described above based on the preferred exemplary embodiments, the present disclosure is not limited to the above-described exemplary embodiments. In addition, the configuration of each component of the present disclosure may be replaced with any configuration that exerts the equivalent functions of the above-described exemplary embodiments, and to which any configuration may be added.

In the above description, a liquid crystal display device is described as an example of the liquid crystal device of the present disclosure, but the liquid crystal device of the present disclosure is not limited thereto. For example, the liquid crystal device of the present disclosure can also be applied to an image sensor, etc.

What is claimed is:

1. A liquid crystal device comprising:
a first substrate;
a second substrate;
a liquid crystal layer disposed between the first substrate and the second substrate, the liquid crystal layer including liquid crystal molecules;
a first spacer disposed between the first substrate and the second substrate, the first spacer being configured to define a distance between the first substrate and the second substrate;
a second spacer adjacent to the first spacer, the second spacer being configured to define the distance between the first substrate and the second substrate;

an electrode disposed between the first substrate or the second substrate and the liquid crystal layer;

a first inorganic oriented film disposed between the electrode and the liquid crystal layer, the first inorganic oriented film including a first vapor deposition film including a columnar column extending inclinedly with respect to a normal line to a surface of the electrode; and a second inorganic oriented film disposed between the first inorganic oriented film and the electrode, the second inorganic oriented film including a second vapor deposition film including a columnar column extending along the normal line to the surface of the electrode, wherein the first inorganic oriented film is provided spaced apart from a side surface of the first spacer in plan view, and is provided along a side surface of the second spacer and an upper surface of the second spacer, the second inorganic oriented film is in contact with the side surface of the first spacer and the side surface of the second spacer, and a film thickness of the first inorganic oriented film increases from the first spacer side to the second spacer side.

2. The liquid crystal device according to claim 1, wherein the first vapor deposition film includes a first region and a second region located between the first region and the first spacer in plan view, the liquid crystal layer includes a first portion corresponding to the first region and a second portion corresponding to the second region, and a pretilt angle of the first portion is greater than a pretilt angle of the second portion.

3. The liquid crystal device according to claim 2, wherein the second vapor deposition film includes a portion located between the second region and the first spacer, the portion not overlapping with the first vapor deposition film in plan view.

4. The liquid crystal device according to claim 2, wherein a film thickness of the second region increases gradually from the first spacer toward a center of the electrode.

5. The liquid crystal device according to claim 1, wherein the first vapor deposition film includes a plurality of films, and an inclination angle of a column of each of the plurality of films with respect to the normal line is different from each other.

6. The liquid crystal device according to claim 1, comprising a plurality of pixel electrodes including the electrode.

7. An electronic apparatus comprising:

the liquid crystal device according to claim 1; and a control unit configured to control operation of the liquid crystal device.

8. The liquid crystal device according to claim 1, wherein the first inorganic oriented film uncovers a portion of the first spacer.

9. The liquid crystal device according to claim 1, wherein the first spacer is in contact with the liquid crystal layer.

* * * * *